(12) United States Patent
Priepke

(10) Patent No.: US 6,904,741 B2
(45) Date of Patent: Jun. 14, 2005

(54) GROOVE DESIGN FOR PRECISION RUBBER/URETHANE CONDITIONING ROLLS

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 87 days.

(21) Appl. No.: 10/702,296

(22) Filed: Nov. 6, 2003

(65) Prior Publication Data

US 2005/0016144 A1   Jan. 27, 2005

Related U.S. Application Data

(60) Provisional application No. 60/468,814, filed on May 8, 2003.

(51) Int. Cl.[7] ............................................. A01D 41/00
(52) U.S. Cl. ................. 56/16.4 C; 56/DIG. 1
(58) Field of Search ........... 56/16.4 R, 16.4 A–16.4 C, 56/1; 492/28, 30, 35, 44, 56

(56) References Cited

U.S. PATENT DOCUMENTS

| 1,958,910 A | 5/1934 | Christiansen ..................... 56/1 |
| 2,464,974 A | 3/1949 | Garvey .......................... 130/5 |
| 2,921,426 A * | 1/1960 | Heth ............................... 56/1 |
| 3,043,073 A | 7/1962 | Bornzin ........................... 56/1 |
| 3,115,737 A * | 12/1963 | Harrer et al. ..................... 56/1 |
| 3,401,507 A * | 9/1968 | Yetter ............................. 56/1 |
| 3,488,929 A | 1/1970 | Hale .............................. 56/1 |
| 3,513,645 A | 5/1970 | Garrett et al. ................... 56/1 |
| 3,712,034 A | 1/1973 | Praca ............................. 56/1 |
| 4,035,991 A | 7/1977 | Oosterling et al. ............... 56/1 |
| 4,216,641 A | 8/1980 | Koch et al. .................. 56/14.4 |
| 4,321,782 A * | 3/1982 | Zweegers ........................ 56/1 |
| 4,516,292 A | 5/1985 | Quay .......................... 56/16.4 |
| 4,821,494 A * | 4/1989 | O'Halloran et al. ...... 56/16.4 C |
| 4,860,528 A | 8/1989 | Seymour ..................... 56/16.4 |
| 4,903,463 A | 2/1990 | Linde et al. ..................... 56/1 |
| 5,778,647 A | 7/1998 | McLean et al. .............. 56/13.6 |
| 6,050,070 A | 4/2000 | Cook .......................... 56/14.1 |
| 6,073,431 A | 6/2000 | Osborne et al. ............. 56/15.7 |
| 6,360,515 B1 | 3/2002 | Cook .......................... 56/14.1 |
| 6,499,283 B1 | 12/2002 | Cook ...................... 56/16.4 B |
| 6,523,262 B1 * | 2/2003 | Kaprelian et al. ......... 29/895.21 |

* cited by examiner

Primary Examiner—Meredith Petravick
(74) Attorney, Agent, or Firm—Collin A. Webb; John William Stader

(57) ABSTRACT

A conditioner roll design is provided that employs unique spiraled stepped grooves that enhance feeding of the crop mat when the rolls are abutted or at precise gaps. The groove has a leading edge and increased depth that allow expansion of the crop mat into the trailing gripper edges to provide gripping without intermeshing. The gripping side of the groove is nearly perpendicular to the direction of crop travel for positive gripping and advancing the crop. The grooves on the two rolls may be selectively timed to either mate at the point of contact or align a groove on one roll with a smooth surface on the other.

22 Claims, 4 Drawing Sheets

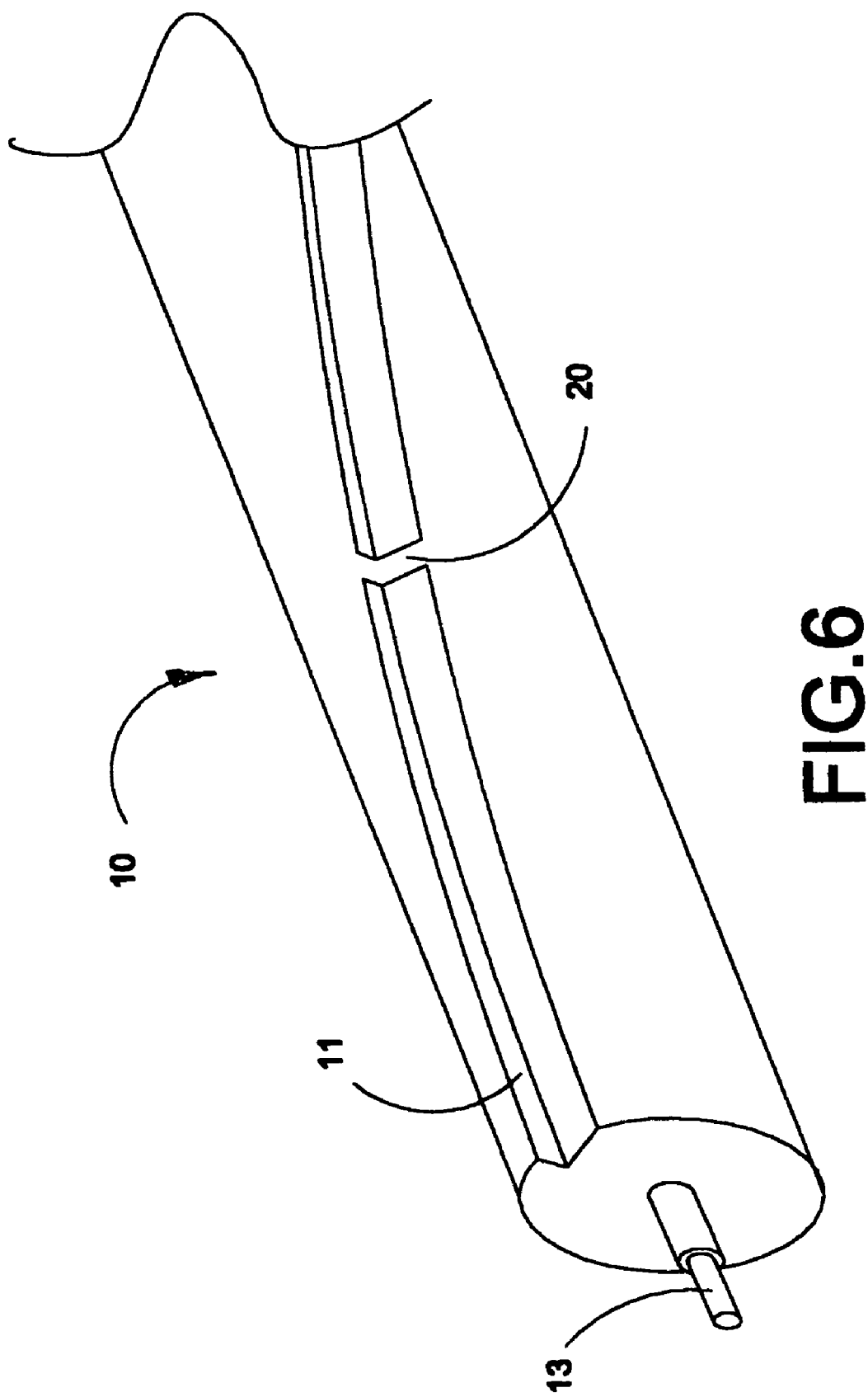

GROOVE DESIGN FOR PRECISION RUBBER/URETHANE CONDITIONING ROLLS

This application claims benefit of U.S. Provisional Patent Application No. 60/468,814 filed May 8, 2003.

BACKGROUND OF THE INVENTION

The present invention relates generally to crop harvesting machines, commonly referred to as mower-conditioners or windrowers and, more particularly, to conditioning rolls for use in such machines.

Mower-conditioners are well known in the agricultural industry, and may be found in various configurations and designs—the common functions including the severing of standing crop material from the ground, the feeding of cut crop material into a conditioner, and the depositing of the conditioned crop material onto the ground for drying. See, for example, pull-type (generally shown in U.S. Pat. No. 4,035,991), pivot tongue (generally shown in U.S. Pat. No. 5,778,647), and self-propelled (generally shown in U.S. Pat. No. 6,073,431). For purposes of providing a description of exemplary conditioner frames, torsion bars and other structure, the three patents mentioned in the immediately preceding sentence are incorporated in full herein by reference. The conditioning operation consists of passing the cut crop material between a pair of parallel co-acting rolls to break open the hard outer shell of the stems of the stalks to facilitate the escape of moisture from the interior of the stems. This enables the stems to dry, or cure, to the desired moisture content for further harvesting operations in substantially the same length of time as the leaves, thereby decreasing the harvesting time as well as yielding a more uniformly cured and more valuable harvested crop.

In the conditioning operation, the cut crop stalks normally pass between the conditioning rolls with the stems generally perpendicular to the axes of the rolls. One type of conditioning operation, known as crimping, employs a pair of rolls having narrow longitudinally extending radially fins. The two rolls are mounted on a frame such that the fins of the two rolls intermesh without touching. In passing between the intermeshing fins, the stem of the stalk is cracked open transversely at regular intervals along its length. Crimper rolls are characterized by their aggressive feeding and stem cracking action; however, they are rough and vibrant in operation and attack the stems only at spaced intervals, leaving pockets of trapped moisture between successive transverse cracks.

Another type of conditioning operation, known as crushing, employs a pair of relatively smooth rolls which co-act to crush the stems of stalks passing therebetween. In passing between the crushing rolls, the stem of a stalk is cracked open longitudinally along its full length, leaving no pockets of trapped moisture; however, neither the feeding action nor the stem cracking action of the crushing rolls is normally as aggressive as that of the crimper. Hence, a crusher is more apt than a crimper to become plugged. Many compromise designs have been employed, such as, for example, co-acting rolls of different diameters; and one smooth roll of steel for its crushing action, co-acting with another smooth roll of rubber, for its enhanced gripping action. Crusher rolls made of various materials and with various surface tread patterns have also been employed in an effort to increase the aggressiveness of the crusher.

Crop and operating conditions, of course, vary the full ranges from thin growth versus thick (i.e., light versus heavy), large diameter stalks versus small diameter, tall crops versus short, hard stalks versus soft, presence of leaves versus absence, wet crops versus dry, and the like. With each of these variations the farmer/operator seeks to locate or identify the most acceptable balance between aggressiveness of feed and conditioner performance that will still give him an efficient and effective crop harvest.

It would be advantageous to provide a conditioner that exhibits the proper balance between aggressive feeding and conditioning for the crops (and similar crops) identified immediately above while increasing the durability of the rolls.

SUMMARY OF THE INVENTION

It is an object of the instant invention to provide an improved conditioner that will give enhanced feeding while maintaining an excellent crushing action to crop stalks.

It is a further object of the instant invention to provide a pair of quiet running, relatively vibrationless co-acting crop conditioning rolls having an aggressive full conditioning action.

It is a still further object of the instant invention to provide a rugged, yet economical crop conditioning roll construction.

It is an even still further object of the instant invention to provide a crop conditioning roll design and construction that facilitates the economic manufacture of rolls.

It is a still further object of the instant invention to provide a crop conditioning roll design for a crop conditioner that reduces the drying time of the conditioned crops.

It is another object of this invention to provide a conditioner that may be installed on existing equipment as a retrofit, or installed on new equipment.

It is yet another object of this invention is to provide a crop conditioner that uses a grooved rubber/urethane roll on the bottom and top rolls that are timed to run either abutted or with a precision gap between the two.

It is a further object of this invention to provide a set of smooth rubber/urethane crushing conditioning rolls that has unique grooving to enhance feeding of the crop material when the rolls are abutted or at precise gaps.

It is another object of this invention to provide a conditioning roll having a groove with a leading edge and a width that allows expansion of the crop material into the trialing gripper edges to provide gripping without intermeshing with the adjacent roll.

It is another object of this invention to provide a grooved conditioning roll wherein the gripping side of the groove is nearly perpendicular to the direction of crop travel for positive gripping and advancing the crop material through the conditioner.

It is another object of this invention to provide a pair of identical conditioning rolls, each having from 3–8 grooves therein to provide a good relationship between the distance from one gripper to the next gripper and the percentage of smooth roll to smooth roll contact for good conditioning and feeding.

It is a further object of this invention to provide a pair of identical grooved conditioning rolls wherein the grooves are spiraled in a single direction or from a chevron arrangement.

It is a further object of this invention to provide a pair of identical grooved conditioning rolls wherein the grooves mate at the point of contact when timed together.

It is a further object of this invention to provide a pair of identical grooved conditioning rolls wherein the grooves form gripper edges and wherein the grooves can be timed to run gripper edge to gripper edge or gripper edge to smooth surface.

It is a further object of this invention to provide a pair of identical grooved conditioning rolls wherein the grooves on each roll includes at least one interruption to allow a fully continuous smooth surface on the roll.

It is a further object of this invention to provide a set of smooth crushing conditioning rolls wherein both rolls have a set of grooves that abut to enhance feeding.

It is a further object of this invention to provide a set of grooved rubber/urethane conditioning rolls that are fabricated of 80 Shore A durometer or higher for improved wear and toughness.

It is a further object of this invention to provide a pair of grooved conditioning rolls where the groove has only two sides.

It is a further object of this invention to provide a set of grooved conditioning rolls which offer a 75–85% smooth roll crushing surface.

It is a further object of this invention to provide a crop conditioner that is durable in construction, inexpensive to manufacture, carefree of maintenance, facile in assemblage, and simple and effective in use.

These and other objects are obtained by providing a conditioner roll design that employs unique spiraled stepped grooves that enhance feeding of the crop mat when the rolls are abutted or at precise gaps. The groove has a leading edge and an increasing depth that allow expansion of the crop mat into the trailing gripper edges to provide gripping without intermeshing. The gripping side of the groove is nearly perpendicular to the direction of crop travel for positive gripping and advancing the crop. The grooves on the two rolls may be selectively timed to either mate at the point of contact or align a groove on one roll with a smooth surface on the other.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a partial front elevation perspective view of one embodiment of a roll depicting an interrupted groove to provide a continuous smooth surface.

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the term "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
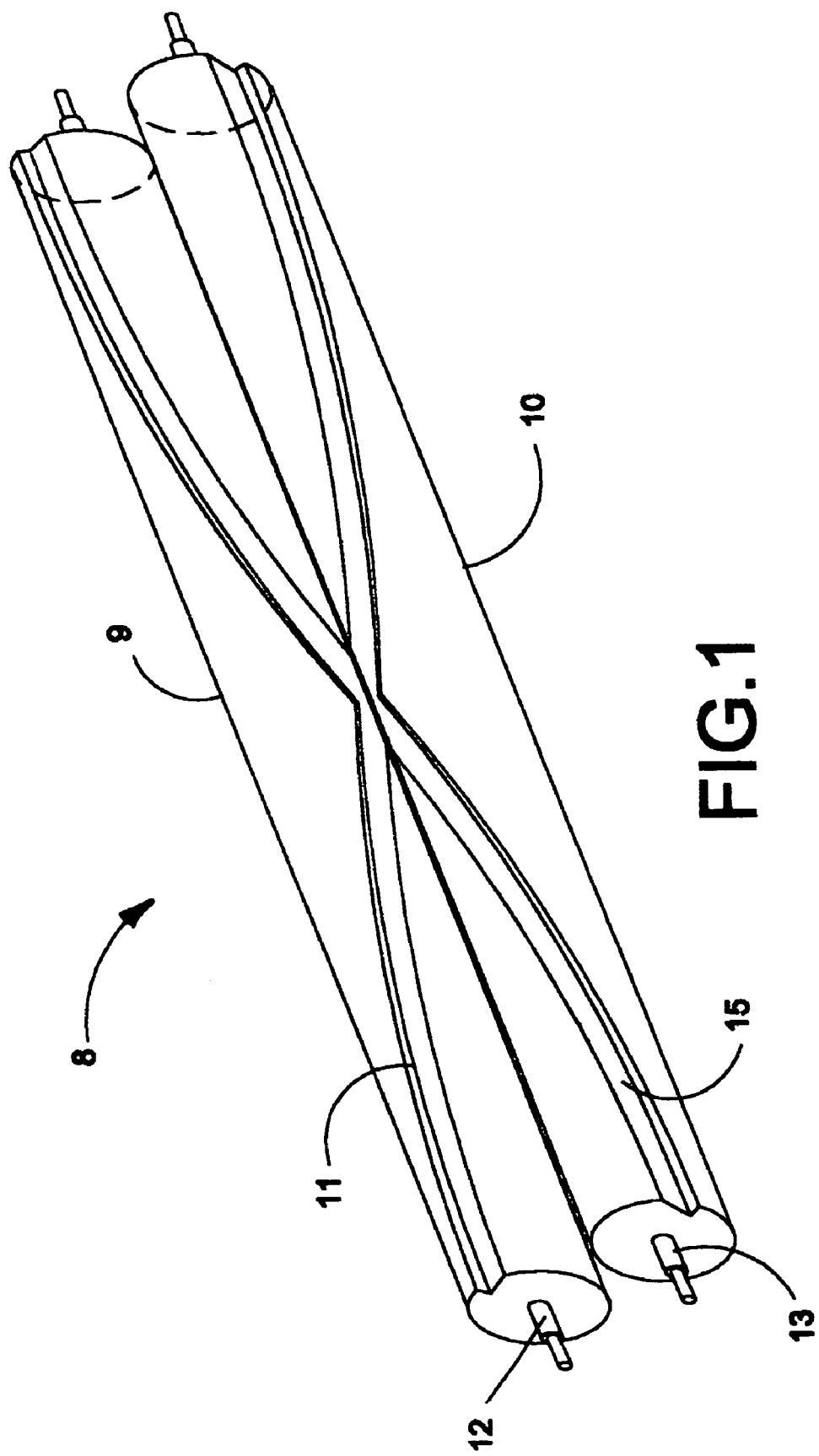
FIG. 1 is a front elevation perspective view of one embodiment of a two roll conditioner incorporating the principles of the instant invention.

FIG. 1 shows a pair 8 of chevron-grooved, generally similar conditioner rolls 9 and 10 in relative position generally as they would be in a crop conditioner. A grooved rubber/urethane conditioning roll 9 is depicted as abutted with another grooved rubber/urethane conditioning roll 10 incorporating the principles of the instant invention. Both rolls 9, 10 are securely attached to framework (not shown) and rotate about fixed longitudinal roll axis 12, 13, respectively. The grooved rubber/urethane conditioning rolls 9, 10 are approximately parallel to one another and the gripping sides of the grooves 11, 15 are nearly perpendicular to the direction of crop travel. As is known in the art, usually only one of the rolls is, most commonly the top roll, the movable roll is biased towards the other under a selectively variable pressure by helical springs, torsion bars or air springs, for example. The rolls both have end caps to enclose the interior and provide support for the rolls on the respective axises. The rolls are generally cylindrical in shape and, as will be discussed further below, can be run abutted or precisely at controlled gaps.

Urethane material of 80 Shore A durometer or higher is preferred for improved wear and toughness. Lower durometer material tends to be too soft, losing effective crushing in some crops and wearing too quickly. The grooves 11, 15 are preferably spiraled with a lead of 3 to 8 degrees (though others may prove workable) of circumference per inch across the length of the roll for smooth operation when abutted. The spiral can be chevron as well as a single spiral.

Figure 2:
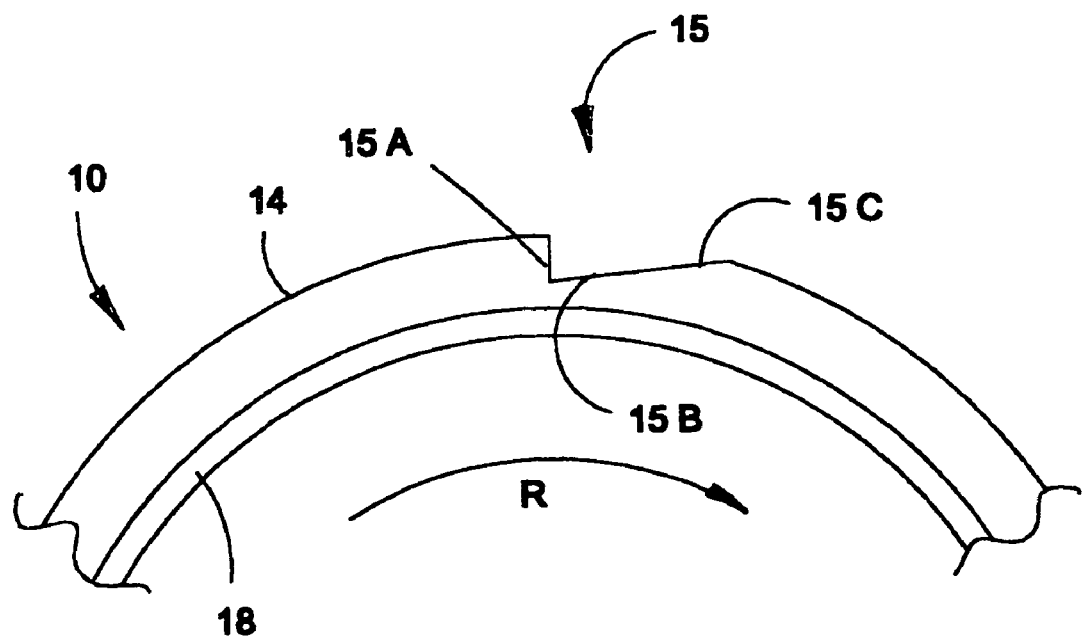
FIG. 2 is an enlarged partial cross sectional view of one embodiment of a roll conditioner showing groove detail.

FIG. 2 is an enlarged partial cross sectional view of one embodiment of the grooved roll 10. The roll 10, which contains grooves 15, is made of rubber or urethane-like material 14 adhered to a tubular steel sleeve 18 by any of the processes well known in the art. The groove has two sides 15A, 15B with a leading edge 15C. The detailed shape of the groove is to have the side at the trailing edge (side 15B) 0.25 to 0.50 inch deep and nearly perpendicular to the tangent of the surface diameter; perpendicular within 15 degrees. The side at the leading edge 15C of the groove should be about 1 to 1.5 inches forward of the trailing edge and should be tapered back from the tangent of the surface diameter to the bottom of side 15A.

Figure 3:
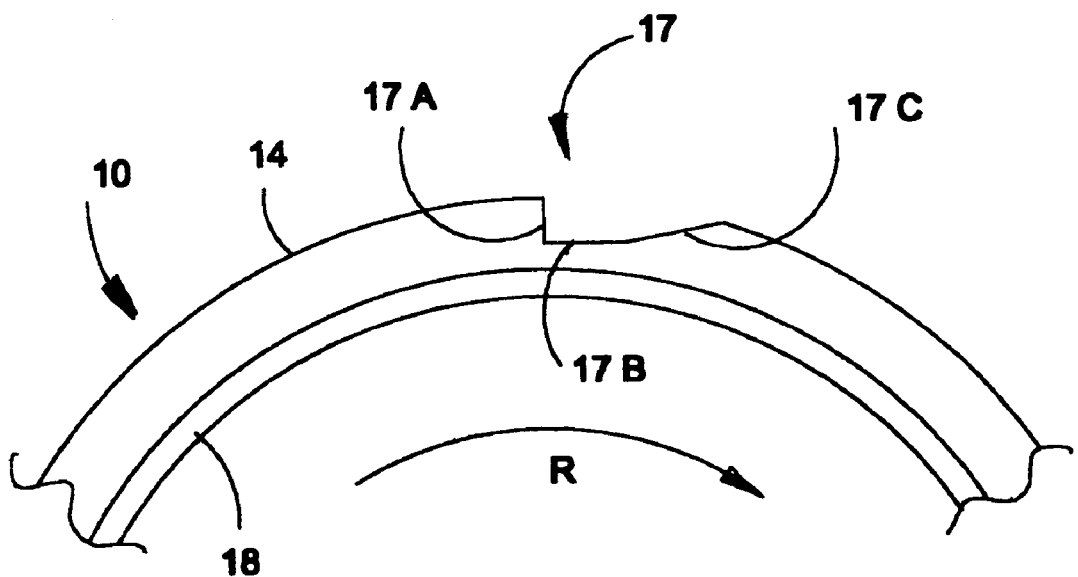
FIG. 3 is also an enlarged partial cross sectional view of another embodiment of a roll conditioner showing groove detail incorporating the principles of the instant invention.

The simplest groove is one with two sides as shown in FIG. 2; but can have more sides as long as trailing and leading sites meet the above criteria. For example, FIG. 3 shows an effective groove with three sides 17A, 17B and 17C.

Figure 4:
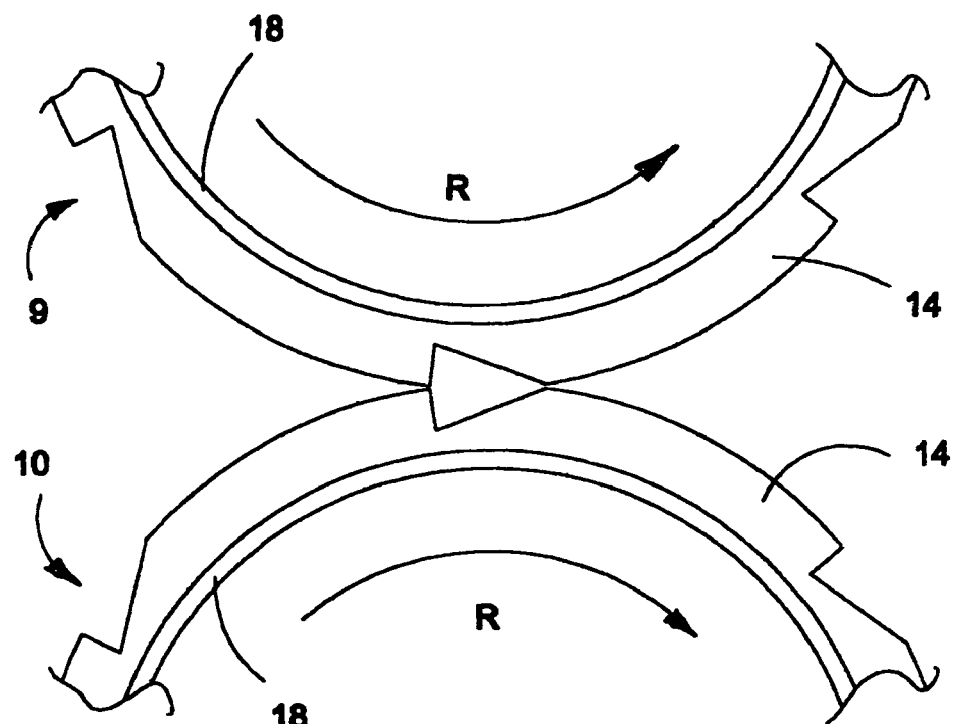
FIG. 4 is also an enlarged partial end view of one embodiment of two rolls depicting the grooves abutted.
Figure 5:
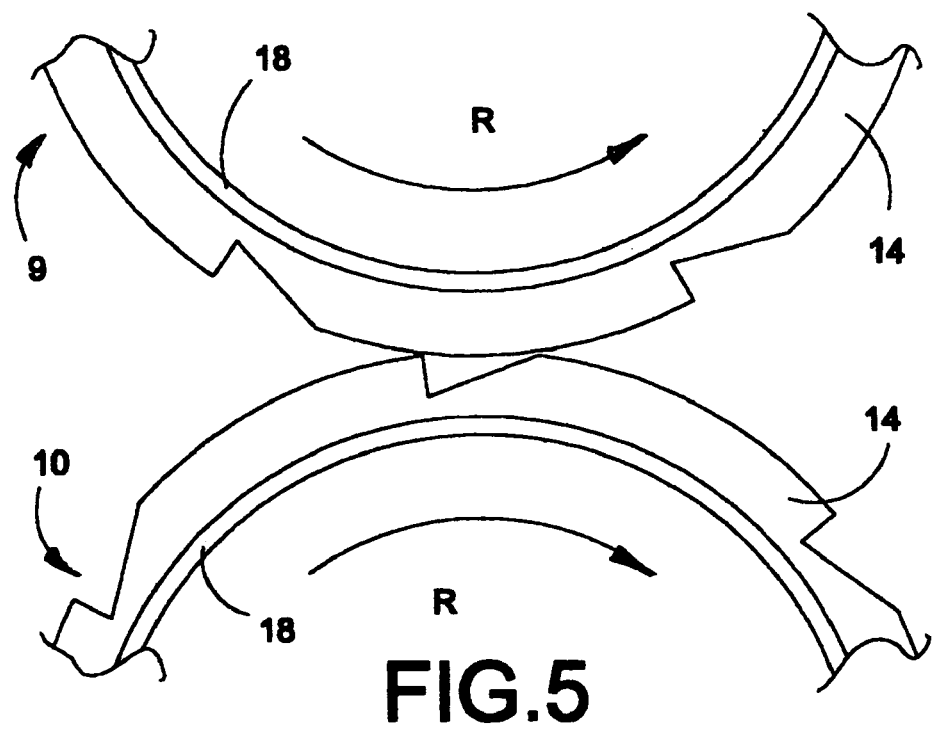
FIG. 5 is an enlarged partial end view of another embodiment of two rolls depicting the grooves offset from one another.

Five grooves have been found to be most generally effective, but this number may be anywhere in the range of 3–8 and provide acceptable results. The grooves and ribs are generally evenly spaced around the peripheral surface of the roll. FIG. 4 depicts the upper and lower rolls 9, 10 timed to match upper roll groove to lower roll groove during operation. The upper roll rotates in a counter clockwise direction while the lower roll rotates in a clockwise direction. FIG. 5 depicts the rolls being timed with the grooves of one roll running against the smooth surface of the other.

FIG. 6 is a partial front elevation perspective view of a slightly modified embodiment including the principles of the instant invention. The smooth rubber/urethane conditioning roll 10 has a simple surface isthmus 20 that bridges each groove 11 to provide a continuous smooth surface on the roll. It is recommended that these surfaces bridges be small, in the range of 0.25 inches wide, and each offset from one another. They could be created by an interruption in the groove cutting. This embodiment performs essentially the same as the other embodiments, with similar results.

These designs have been found particularly successful in creating a superior conditioning action with good feeding characteristics. When conditioning, the trailing edge of the grooves provides gripping edges on the compressed crop mat to positively feed the crop mat through the rolls. The tapered leading edge and the greater than 1 inch distance to the trailing edge provides space for the crop mat to expand into the gripping edges. When five grooves are time to run together, there is a 75–85% smooth roll crushing surface.

This design offers operating flexibility in timing the grooves to run together or alternating against smooth surfaces for optimal performance in different crop conditions like light alfalfa to heavy grass. Under some crop conditions, operation in abutment results in pinching off of buds and branches, which is a significant negative result; however, with the design of rolls herein described, a precision gap can be used to avoid severe damage to the crop. Finally, with crops with larger stems like cane, the gap can be increased further for optimal feeding performance.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention and preferred embodiments,

What is claimed is:

1. A roll assembly for use on a crop conditioning machine comprising:

first and second elongate rotatable rolls supported in a framework for rotation about respective first and second axes of rotation and disposed in adjacent parallel relationship, said first roll generally above said second roll;

each said first and second rolls having a peripheral surface;

said second roll comprising an elongate cylindrical rigid body portion having a generally smooth peripheral surface with a layer of hard elastomeric material affixed thereto, said elastomeric layer having at least one groove therein, said groove being formed in a spiral along the length of said rigid body portion; and said at least one groove generally having a cross-sectional configuration comprised of at least a first and second surfaces, said first surface being generally perpendicular to the tangent of said peripheral surface of said second roll and said second surface tapering at an angle from the edge of said first surface closest to said second axis of rotation, the intersection of said second surface and said peripheral surface of said second roll forming a leading edge.

2. The assembly of claim 1, wherein:

said first surface has a depth in the range of 0.25 to 0.50 inches.

3. The assembly of claim 2, wherein:

said second surface has a length in the range of 1.0 to 1.5 inches.

4. The assembly of claim 3, wherein:

said first and second rolls are substantially identical and said at least one groove is an equal number of each in the range of 3 to 8; and said grooves are symmetrically and continuously arranged around the respective peripheral surfaces of first and second rolls.

5. The assembly of claim 4, wherein:

said elastomeric material is urethane.

6. The assembly of claim 5, wherein:

said elastomeric material comprises 80 Shore A durometer or higher.

7. The assembly of claim 6, wherein:

said first and second rolls are timed to rotate such that the grooves on said first and second rolls are aligned.

8. The assembly of claim 6, wherein:

said first and second rolls are timed to rotate such that the grooves on said first and second rolls are not aligned.

9. The assembly of claim 6, wherein:

said first and second rolls can be selectively timed such that the grooves on said first and second rolls may be either aligned or not aligned.

10. The assembly of claim 9, wherein: said first and second rolls abut.

11. The assembly of claim 9, wherein:

said first surface of said at least one groove is nearly perpendicular to the direction of crop travel through said first and second rolls.

12. The assembly of claim 10 wherein:

said at least one groove is continuous.

13. The assembly of claim 3, wherein:

said at least a first and second surfaces includes a third surface adjacent to said second surface and at a slight upward angle relative thereto.

14. A conditioner roll for use on a crop conditioning machine comprising:

an elongate rotatable roll having an axis of rotation and a peripheral surface;

said roll comprising an elongate cylindrical rigid body portion having a generally smooth peripheral surface with a layer of hard elastomeric material affixed thereto, said elastomeric layer having at least one groove therein, said groove being formed in a spiral along the length of said rigid body portion; and said at least one groove generally having a cross-sectional configuration comprised of at least a first and second surfaces, said first surface being generally perpendicular to the tangent of said peripheral surface of said roll and said second surface tapering at an angle from the edge of said first surface closest to said axis of rotation, the intersection of said second surface and said peripheral surface of said roll forming a leading edge.

15. The roll of claim 14, wherein:
said first surface has a depth in the range of 0.25 to 0.50 inches.
16. The roll of claim 15, wherein:
said second surface has a length in the range of 1.0 to 1.5 inches.
17. The roll of claim 16, wherein:
said at least one groove comprises 3 to 8; and
said grooves are symmetrically and arranged around the said peripheral surface of said roll.
18. The roll of claim 17, wherein:
said at least a first and second surfaces includes a third surface adjacent to said second surface and at a slight upward angle relative thereto.

19. The assembly of claim 18, wherein:
said elastomeric material is urethane.
20. The roll of claim 19, wherein:
said elastomeric material comprises 80 Shore A durometer or higher.
21. The roll of claim 19, wherein:
said first surface of said at least one groove is nearly perpendicular to the direction of crop travel through said first and second rolls.
22. The assembly of claim 20 wherein:
said at least one groove is continuous.

* * * * *